A. W. BROWNE.
BRACKET.
APPLICATION FILED OCT. 2, 1911.
1,075,541.
Patented Oct. 14, 1913.
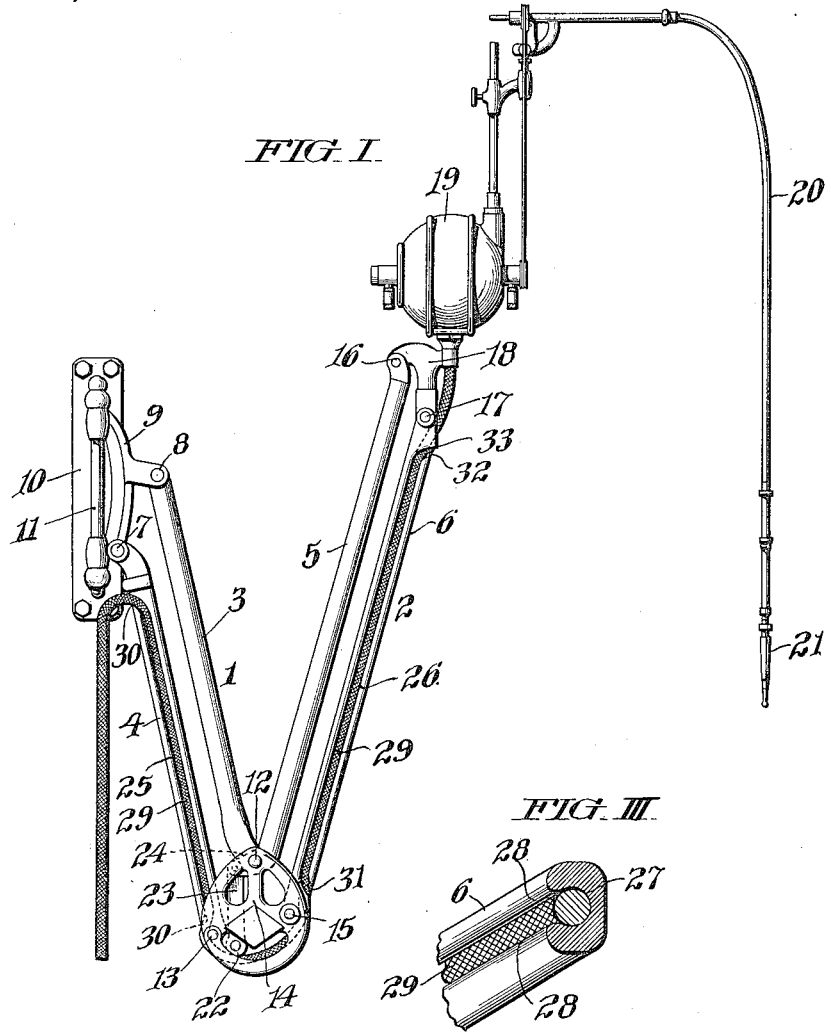
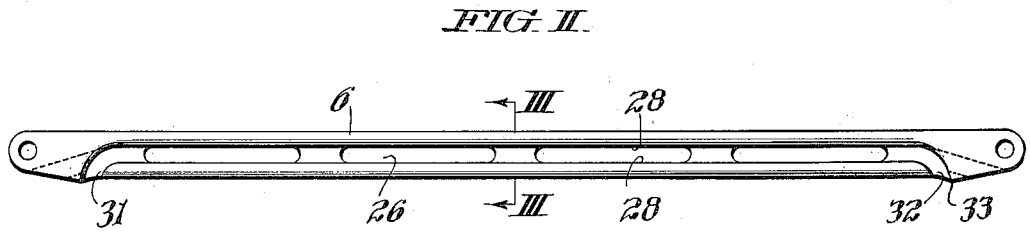

UNITED STATES PATENT OFFICE.

ARTHUR W. BROWNE, OF PRINCE BAY, NEW YORK, ASSIGNOR TO THE S. S. WHITE DENTAL MANUFACTURING COMPANY, OF PHILADELPHIA, PENNSYLVANIA, A CORPORATION OF PENNSYLVANIA.

BRACKET.

1,075,541.   Specification of Letters Patent.   Patented Oct. 14, 1913.

Application filed October 2, 1911. Serial No. 652,271.

*To all whom it may concern:*

Be it known that I, ARTHUR W. BROWNE, a citizen of the United States, and a resident of Prince Bay, in the county of Richmond, State of New York, have invented certain new and useful Improvements in Brackets, of which the following is a specification.

My invention relates to wall brackets which are designed and intended to support electric motors and it has particular reference to the means provided in connection with such brackets for supporting the conductor for supplying electricity to said motor to operate it.

I have shown my invention as applied to a construction of bracket previously invented by me and illustrated and described in Letters Patent of the United States No. 918,276, granted April 13, 1909 to my assignee. In the said patent members of the main section and fore-arm section of which the bracket consists are hollow and the electric conductor is threaded therethrough and is supported thereby. It has been found to be a difficult task to thread the conductor through said hollow members; and also in order to thread the conductor through the said members it is necessary to disconnect the same either from the motor or from the junction box or other part or parts to which it is connected. The disconnected end of the conductor is then inserted into one of the hollow members and threaded therethrough and is then inserted into the other of said hollow members and in like manner threaded through it. This operation of disconnecting the conductor and threading the same through the said hollow members, as stated, entails considerable work and trouble and the loss of a great deal of time.

The object of my present invention is to obviate such work and trouble and loss of time by so constructing a member or members of the bracket that the conductor may be quickly and readily secured thereto without the necessity of threading the same through a hollow member or members therethrough and therefore without disconnecting the same either from the motor or from any other object or part to which it may be connected.

Although I have illustrated my invention as employed in connection with a bracket such as is illustrated and described in Letters Patent No. 918,276, it should be understood that the same may be embodied in other and different forms and constructions of brackets.

In the accompanying drawing I have illustrated one embodiment of my invention in which channels are provided in members or parts of the bracket, the walls of which channels are undercut so that the edges of the said channels are nearer together than the sides of the intermediate portions thereof. It will be understood that changes in the details of construction may be made within the scope of the claims without departing from my invention.

In the drawing: Figure I is a side elevation of a bracket embodying my invention; Fig. II is a side elevation of one of the parts employed in the construction thereof; and Fig. III is a view taken on the line III—III of Fig. II and showing a portion of the part in said figure in perspective.

In the drawing, a dental bracket is illustrated and it consists of a main section 1 and a forearm section 2 each section being composed of two parallel members 3 and 4, and 5 and 6 respectively. The members 3 and 4 are pivotally connected at 7 and 8 to a bracket member 9 having horizontal turning connection with a stationary plate 10 secured to a wall or other suitable support. A pintle 11 serves to connect the bracket member 9 to the stationary plate 10. The outer ends of the members 3 and 4 are respectively pivotally connected at 12 and 13 to a connecting plate or plates 14. There are in the construction illustrated two of said plates, only one of which, however, is shown. The members 5 and 6 of the forearm section are pivoted at their inner ends at 12 and 15 to the said plate or plates 14. It will be observed that the inner end of the member 5 is connected to the same pivot as the outer end of the member 3. The members 5 and 6 are pivoted at 16 and 17 to an end piece or connecting member 18 which not only serves as a means for connecting the outer ends of the said members 5 and 6 together but also as a means for supporting an electric dental engine motor 19, the flexible shaft 20 and hand piece 21 carried thereby.

For the purpose of causing the sections 1 and 2 of the bracket to move in unison toward and away from each other and maintain corresponding angular relations with respect to a vertical plane drawn centrally between said sections, the outer end of member 4 is provided with a projection or extension 22 which is connected by means of a link 23 to a projection or extension 24 of the inner end of the member 5 of the forearm section 2.

As thus far described the construction is the same or substantially the same as that illustrated in the said Patent No. 918,276.

My invention consists in the provision of a channel or channels in the bracket or a member or members thereof for the reception and support of an electric conductor. In the construction shown the channel or channels are provided in the members 4 and 6 and are indicated by the reference numbers 25 and 26. The main portions of these channels preferably are circular, as indicated at 27 in Fig. III of the drawings. The outer edges 28 of the walls of the said channels are nearer to each other than the distance between the opposite sides of the central portions thereof. In other words, the opposite sides of the said channels are undercut so that when a conductor, such as 29, the diameter of which is substantially equal to the greatest diameter of the said channels, is pushed or forced into the said channels through the mouths thereof, the said conductor is firmly held in position. It will be observed that the said channels extend substantially from end to end of the members 4 and 6. The member 4 is provided with notches 30 at the opposite ends of the channels 25 through which the conductor 29 passes from said channel. The member 6 is provided with a notch 31 at its inner end through which the conductor 29 leaves the channel 26 and said member is also provided adjacent to its outer end with a notch 32.

33 indicates an overhanging portion of the member 6 beyond the notch 32 under which the conductor 29 at a point near its outer end is located.

The continuation of the groove 26 in the direction of the length of the member 6 underneath the overhanging portion 33 obviates the necessity of a more or less sharp bend in the conductor 29 at a point adjacent to the motor 19, thereby enhancing the neatness in appearance and also providing an additional security for preventing accidental disconnection of the outer portion of the said conductor from the channel 26.

In connecting and securing the conductor to the bracket it is pushed into the channels 25 and 26 through the mouths thereof and is placed or positioned in the notches 30 and 31, and in order to place the same underneath the overhanging portion 33 it is first placed in the notch 33 and is then slid laterally under such portion.

The portion of the conductor intermediate the notch 31 at the inner end of the member 6 and the notch 30 at the outer end of the member 4 is located between the lower curved edges of the connecting plates 14 and is substantially concealed by them and is also prevented from being engaged by external objects and thereby possibly dislocated partially or wholly from the grooves 25 and 26.

Having thus described my invention, I claim:—

1. An adjustable wall bracket for supporting an electric motor and including, in combination, a wall plate, a main section composed of parallel members pivoted to said wall plate, and a forearm section composed of parallel members, the said sections being pivotally connected to each other and one of the members of each of the said sections being provided with a longitudinal channel having a continuously open side for the reception and support of an electric conductor, the said channel at its point of greatest width being substantially equal to the diameter of the said conductor and the mouth of the said channel being of less width.

2. An adjustable wall bracket including, in combination, a wall plate, a main section composed of parallel members pivoted to said wall plate and a forearm section adapted to support an electric motor at its outer extremity, each of the said sections or a part thereof being provided with a channel the mouth of which is narrower than the main portion thereof, and the outer end of the forearm part being provided with a portion which overhangs the outer end of the channel in said part.

3. An adjustable wall bracket including, in combination, a wall plate, a main section pivoted to said wall plate, and a forearm section the inner end of which is pivoted to the outer end of the said main section and which is adapted to support an electric motor at its outer extremity, each of the said sections or a member thereof being provided with a channel the walls of which are undercut and the said sections or members thereof, having notches in their sides which communicate with the said channels, which channels are adapted to receive an electric conductor.

4. A bracket for supporting a motor, which bracket is provided with a longitudinal channel in one of its sides adapted to receive and support an electric conductor which conductor is retained in position in said channel by its side walls and the side of said channel being open from end to end whereby the conductor may be inserted laterally therein at any point without disconnecting the same from the motor or other part to which it may be connected.

5. An adjustable wall bracket for supporting the electric motor of a dental engine, including in combination a wall plate, a main section composed of parallel members pivoted to said wall plate, and a forearm section also composed of a similar number of parallel members, said sections being pivotally connected, the lower member of each section being provided with a longitudinal channel having a continuously open side for the reception and support of an electric conductor, the opening in the side of said channel being of a width less than the greatest width of said channel and less than the diameter of said electric conductor, the proximate ends of each of said lower members being prolonged above and beyond the ends of said channels, with formation of a solid pivot-supporting portion, whereby an electric conductor received within the channeled portions of the two members may be led below the prolonged pivot-supporting ends of said channeled members, where said conductor passes from the channel of one member to the channel of the other member.

In testimony that I claim the foregoing as my invention, I have hereunto signed my name this 23d day of September, A. D. 1911.

ARTHUR W. BROWNE.

In the presence of—
ALBERT A. SIEVERS,
GEORGE H. BROWNE.

---

Copies of this patent may be obtained for five cents each, by addressing the "Commissioner of Patents, Washington, D. C."